(12) United States Patent
Crockett

(10) Patent No.: US 8,094,919 B2
(45) Date of Patent: Jan. 10, 2012

(54) MAGNETIC INK CHARACTER RECOGNITION ('MICR') SIGNAL GENERATION FOR A MICR

(75) Inventor: Timothy W. Crockett, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1064 days.

(21) Appl. No.: 11/953,447

(22) Filed: Dec. 10, 2007

(65) Prior Publication Data
US 2009/0148029 A1    Jun. 11, 2009

(51) Int. Cl.
G06K 9/00 (2006.01)
(52) U.S. Cl. ....................................................... 382/139
(58) Field of Classification Search .................. 382/100, 382/135, 137, 138, 139, 140
See application file for complete search history.

(56) References Cited

U.S. PATENT DOCUMENTS

| | | | | |
|---|---|---|---|---|
| 3,882,463 A * | 5/1975 | Britt | ............................... | 382/217 |
| 3,987,411 A * | 10/1976 | Kruklitis et al. | .............. | 382/208 |
| 5,054,092 A * | 10/1991 | LaCaze | .......................... | 382/139 |
| 5,992,741 A * | 11/1999 | Robertson et al. | ............ | 235/449 |
| 6,243,504 B1 * | 6/2001 | Kruppa | .......................... | 382/318 |
| 6,257,488 B1 * | 7/2001 | Robertson et al. | ............ | 235/449 |
| 7,929,749 B1 * | 4/2011 | Jones et al. | ..................... | 382/135 |
| 7,940,979 B2 * | 5/2011 | Ronca et al. | .................. | 382/137 |

* cited by examiner

Primary Examiner — Anand Bhatnagar
(74) Attorney, Agent, or Firm — Edward J. Lenart; Thomas E. Tyson; Biggers & Ohanian, LLP

(57) ABSTRACT

Methods, systems, and apparatus are disclosed for Magnetic Ink Character Recognition ('MICR') signal generation for a MICR character configured on a medium that include: exposing, by an emitter, an electromagnetic signal to the MICR character, the MICR character absorbing a portion of the electromagnetic signal; detecting, by a receiver, a remaining portion of the electromagnetic signal, the remaining portion of the electromagnetic signal representing the character density for the MICR character; generating a character density signal, the character density signal being dependent upon the detected remaining portion of the electromagnetic signal; and determining a MICR signal for the MICR character, the MICR signal being dependent upon the character density signal.

18 Claims, 4 Drawing Sheets

One  Two  Three  Four

Five  Six  Seven  Eight

Nine  Zero  R-T Symbol  Amount Symbol

On-Us Symbol  Dash Symbol

MAGNETIC INK CHARACTER RECOGNITION ('MICR') SIGNAL GENERATION FOR A MICR

BACKGROUND OF THE INVENTION

1. Field of the Invention

The field of the invention is data processing, or, more specifically, methods, systems, and apparatus for Magnetic Ink Character Recognition ('MICR') signal generation for a MICR character.

2. Description of Related Art

Banks, credit unions, and other financial institutions regularly process checks, deposit slips, and other types of bank documents in order to execute financial transactions efficiently. To aid automated processing of these financial transactions efficiently, information is typically printed on these documents in magnetic ink that can be read both by the human eye and a computer. This form of printing is typically interpreted by computer using a conventional process referred to as Magnetic Ink Character Recognition ('MICR'). As part of the recognition process, a MICR magnetic read head is used to read the MICR characters printed on the document. The American National Standards Institute with the American Bankers Association as Secretariat has promulgated print and test specifications related to the MICR process.

Because misinterpretation of information encoded in financial documents using MICR characters may be extremely costly for participants in the financial transaction, MICR system designers often verify the information identified by a MICR system using a redundant optical character recognition ('OCR') system. That is, a computing system uses both a conventional MICR system and a conventional OCR system to identify the characters encoded on the document. The computing system then compares the results from the conventional MICR system and the conventional OCR system to determine whether the results match. The drawback to verifying the results of a conventional MICR system using a conventional OCR system is that conventional OCR systems typically utilize large amounts of computer resources compared to the computing resources consumed by conventional MICR systems. As such, using conventional OCR systems to perform verification introduces tremendous overhead in a computing system used to process financial transactions. Readers will, therefore, appreciate any improvements to conventional systems.

SUMMARY OF THE INVENTION

Methods, systems, and apparatus are disclosed for Magnetic Ink Character Recognition ('MICR') signal generation for a MICR character configured on a medium that include: exposing, by an emitter, an electromagnetic signal to the MICR character, the MICR character absorbing a portion of the electromagnetic signal; detecting, by a receiver, a remaining portion of the electromagnetic signal, the remaining portion of the electromagnetic signal representing the character density for the MICR character; generating a character density signal, the character density signal being dependent upon the detected remaining portion of the electromagnetic signal; and determining a MICR signal for the MICR character, the MICR signal being dependent upon the character density signal.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
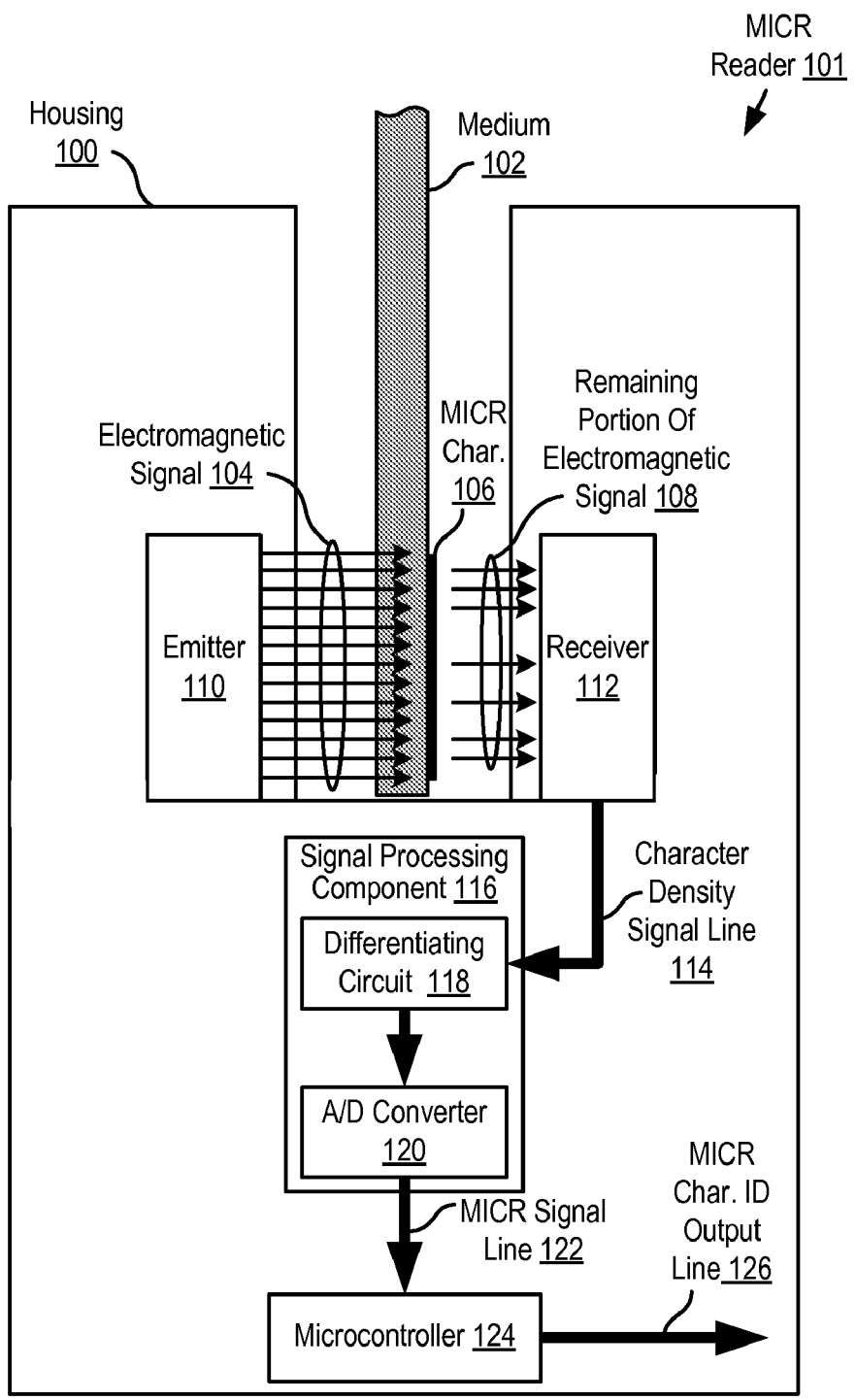
FIG. 1 sets forth a functional block diagram of an exemplary MICR reader capable of MICR signal generation for a MICR character according to embodiments of the present invention.

Exemplary methods, systems, and apparatus for Magnetic Ink Character Recognition ('MICR') signal generation for a MICR character in accordance with the present invention are described with reference to the accompanying drawings, beginning with FIG. 1. FIG. 1 sets forth a functional block diagram of an exemplary MICR reader (101) capable of MICR signal generation for a MICR character (106) according to embodiments of the present invention. The MICR character (106) is configured on a medium (102), typically, check paper but may be any other material as will occur to those of skill in the art. The MICR character (106) may be implemented as any MICR character, that is number, letter, or symbol such as those specified by the ANS X9.27-2000 "Print and Test Specifications for Magnetic Ink Printing as promulgated by the American National Standards Institute ('ANSI').

The MICR reader (101) of FIG. 1 includes a housing (100) to which each of the components (110, 112, 116, 112) are mounted. Examples of MICR readers that may be improved for MICR signal generation for a MICR character according to embodiments of the present invention may include the Magtek Mini MICR Check and MSR Reader, the HHP MICR Check Reader 4683, the Checkmate 2500 MICR Check Reader, and so on.

The exemplary MICR reader (101) of FIG. 1 includes an emitter (110) mounted to the housing (100). The emitter (110) is capable of exposing an electromagnetic signal (104) to the MICR character (106). The emitter (110) of FIG. 1 may be implemented as photodiode using bipolar, vacuum or organic technology or any other electronic component as will occur to those of ordinary skill in the art. In the example of FIG. 1, the electromagnetic signal (104) leaves the emitters (110) and passes through a thin slot (not shown) that extends from the top of the MICR character (106) to the bottom of the MICR character (106). This slot may be substantially greater in height than width.

The electromagnetic signal (104) of FIG. 1 is typically implemented at a frequency such that the portion of the electromagnetic signal (104) that falls on the magnetic ink used to form the MICR character (106) is absorbed much more than the portion of the electromagnetic signal (104) that falls directly on the medium (102). In the example of FIG. 1, therefore, the MICR character (106) absorbs a portion of the electromagnetic signal (104) that falls on the MICR character (106).

The exemplary MICR reader (101) of FIG. 1 includes a receiver (112) mounted to the housing (100). The receiver (112) of FIG. 1 is oriented to detect a remaining portion (108) of the electromagnetic signal (104) that is not absorbed by the MICR character (106). In the example of FIG. 1, the receiver (112) of FIG. 1 is oriented such that the emitter (110) and the receiver (112) are on opposite sides of the medium (102). That is, the emitter (110) transmits the electromagnetic signal (104) through the medium, a portion of which is absorbed by the MICR character (106) and a remaining portion (108) of the electromagnetic signal (104) that is detected by the receiver (112). The receiver (112) of Figure may be implemented as a phototransistor using bipolar, vacuum or organic technology or any other component as will occur to those of skill in the art.

The remaining portion (108) of the electromagnetic signal (104) of FIG. 1 represents the character density for the MICR character (106). The receiver (112) is capable of generating a character density signal, the character density signal being dependent upon the detected remaining portion (108) of the electromagnetic signal (104). That is, as the medium (102) passes between the emitter (110) and the receiver (112), the receiver (112) generates a character density signal for the MICR character (106) as the MICR character (106) passes between the emitter (110) and the receiver (112) from the left side to the right side of the MICR character (106). The character density signal typically represents the portion of a vertical slice of the MICR character (106) that contains magnetic ink, across a plurality of vertical slices of the MICR character (106), typically from left to right.

The MICR reader (101) of FIG. 1 also includes a signal processing component (116). The signal processing component (116) is operatively coupled to the receiver (112) through a character density signal line (114). The character density signal line (114) carries the character density signal from the receiver (112) to the signal processing component (116). The signal processing component (116) is capable of determining a MICR signal for the MICR character (106), the MICR signal being dependent upon the character density signal. The MICR signal represents the change in character density across a MICR character (106), typically from the left to the right.

The signal processing component (116) of FIG. 1 includes a differentiating circuit (118). The differentiating circuit (118) may be implemented as a resistive-capacitive circuit that calculates the MICR signal as a derivative of the character density signal. The signal processing component (116) of FIG. 1 also includes an analogue-to-digital ('A/D') converter (120). The A/D converter (120) of FIG. 1 digitizes the MICR signal into discrete values at a particular sampling rate appropriate for the MICR signal. Although FIG. 1 depicts an analogue MICR signal being fed into the A/D converter (120), readers will note that in some embodiments, the character density signal may be converted into a digital signal. The digital character density signal may then be converted into the MICR signal using a digital differentiation algorithm.

The MICR reader (101) of FIG. 1 also includes a microcontroller (124). The microcontroller (124) is operatively coupled to the signal processing component (116) through a MICR signal line (122). The microcontroller (124) is capable of identifying the MICR character (106) using the MICR signal. The microcontroller (124) may identify the MICR character (106) by comparing the peaks and troughs for the MICR signal to a set of MICR character profiles and selecting an identifier for the MICR character having a profile matching the peaks and troughs for the current MICR signal. Each MICR character profile specifies the peaks and troughs for a particular MICR character's MICR signal. The microcontroller (124) of FIG. 1 may then provide the MICR character identifier to some other component or software module through a MICR character identifier output line (126).

Readers will note that in the example of FIG. 1, the emitter (110) and the receiver (112) are mounted on opposite sides of the medium (102). In such an example, the electromagnetic signal (104) may be implemented at a frequency of signal that is absorbed by the magnetic ink of the MICR character (106), but passes with relative ease through the medium (102) on which the MICR character (106) is configured. Examples of such an electromagnetic signal may include electromagnetic signals in the infrared or near infrared frequency range. Such an example, however, is for explanation only and not for limitation. In fact, in some other embodiments, the emitter (110) and the receiver (112) are mounted on a same side of the medium (102). In such an embodiment, the electromagnetic signal (104) may be implemented at a frequency of signal that is absorbed by the magnetic ink of the MICR character (106) and is reflected off of the medium (102) on which the MICR character (106) is configured.

Figure 2:
FIG. 2 sets for a line drawing of fourteen exemplary MICR characters useful in MICR signal generation for a MICR character according to embodiments of the present invention.
Figure 2:
Figure 2:
Figure 2:
Figure 2:
Figure 2:
Figure 2:
Figure 2:
Figure 2:
Figure 2:
Figure 2:
Figure 2:
Figure 2:
Figure 2:

For further explanation, FIG. 2 sets for a line drawing of fourteen exemplary MICR characters useful in MICR signal generation for a MICR character according to embodiments of the present invention. The fourteen MICR character depicted in FIG. 2 represent the E13-B character set, which contains ten numbers and four symbols as defined in the ANSI X9.27-2000 Print and Test Specifications for Magnetic Ink Printing, as promulgated by the American Bankers Association. When used on a document for automated machine reading, the numbers and symbols in FIG. 2 must be printed magnetic ink. ANSI X9.27 defines the dimensions of each character and the expected nominal waveform peak positions and relative amplitude of waveform peaks.

Figure 3A:
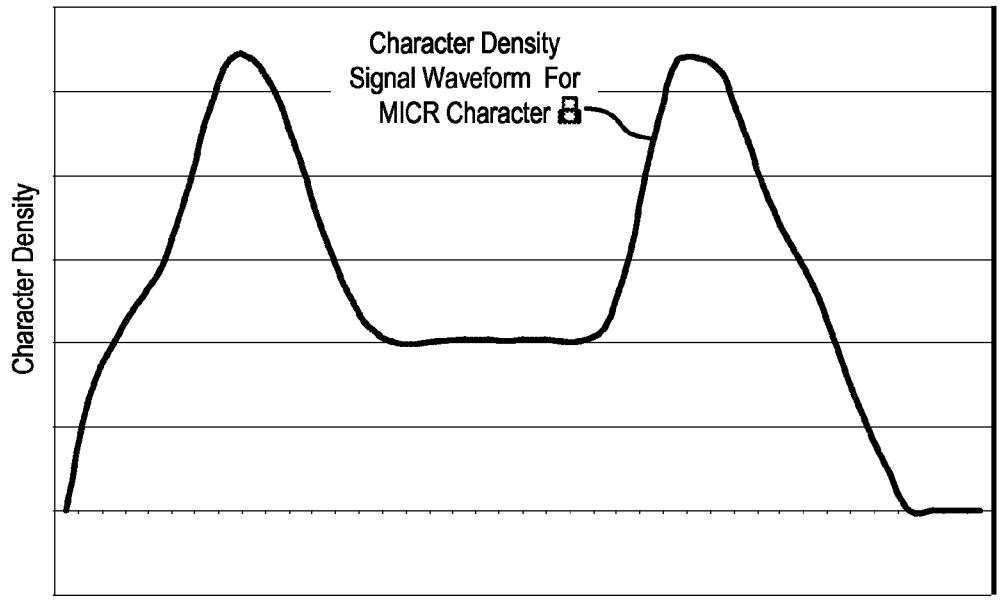
FIG. 3A sets forth a waveform diagram of an exemplary waveform for an exemplary character density signal for an exemplary MICR character useful in MICR signal generation for a MICR character according to embodiments of the present invention.

FIG. 3A sets forth a waveform diagram of an exemplary waveform for an exemplary character density signal for an exemplary MICR character useful in MICR signal generation for a MICR character according to embodiments of the present invention. The waveform in the example of FIG. 3A is a waveform for the character density signal for a MICR character '8' as the character passes from left to right between an emitter and receiver of a MICR reader such as the one described above with reference to FIG. 1. The receiver generates the character density signal based on the detecting the remaining portion of an electromagnetic signal that is not absorbed by the MICR character. As mentioned above, the character density signal typically represents the portion of a vertical slice of the MICR character that contains magnetic ink, across multiple vertical slices of the MICR character, typically from left to right. The waveform therefore illustrates the relative character density for the MICR character '8' at various positions from the left edge of the MICR character.

In the example of FIG. 3A, the left peak of the character density signal waveform corresponds to the left side of the MICR character '8.' The left peak is formed because large portions of the vertical slices of the left side of the MICR character '8' contain magnetic ink. Similarly, the right peak of the character density signal waveform in the example of FIG. 3A corresponds to the right side of the MICR character '8.' The right peak is formed because large portions of the vertical slices of the right side of the MICR character '8' contain magnetic ink. The middle trough of the character density signal waveform in the example of FIG. 3A corresponds to the middle of the MICR character '8.' The middle trough is formed because portions of the vertical slices of the middle of the MICR character '8' contain less magnetic ink than the portions of the vertical slices of the left and right sides of the MICR character '8'.

Figure 3B:
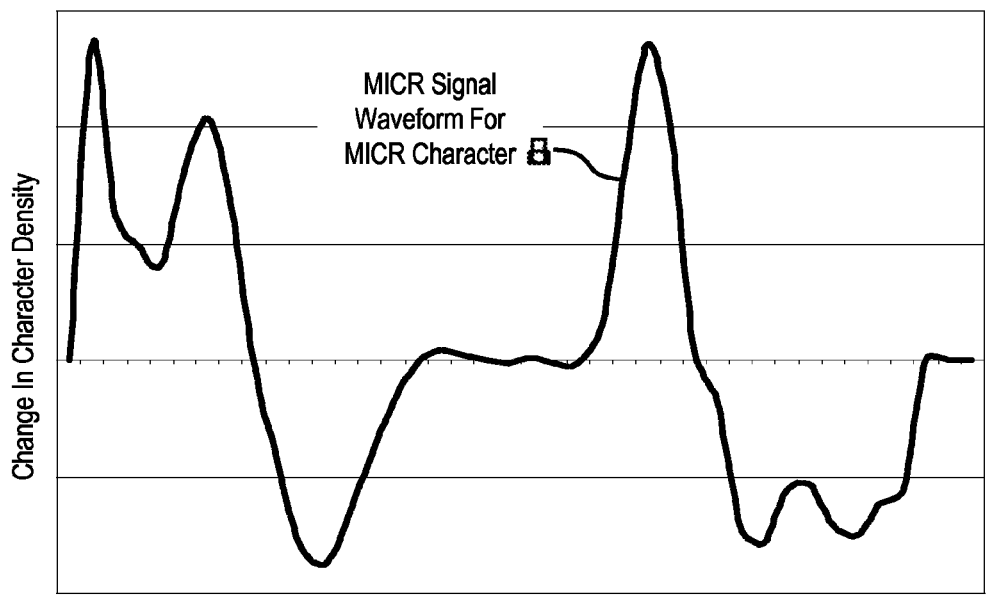
FIG. 3B sets forth a waveform diagram of an exemplary waveform for an exemplary MICR signal for an exemplary MICR character useful in MICR signal generation for a MICR character according to embodiments of the present invention.

FIG. 3B sets forth a waveform diagram of an exemplary waveform for an exemplary MICR signal for an exemplary MICR character useful in MICR signal generation for a MICR character according to embodiments of the present invention. The waveform in the example of FIG. 3B is a waveform for the MICR signal for a MICR character '8' as the character passes from left to right between an emitter and receiver of a MICR reader such as the one described above with reference to FIG. 1. A signal processing component of the MICR reader determines the MICR signal for the MICR character '8' in dependence upon the character density signal for the MICR character '8.' As mentioned above, the MICR signal represents the change in character density across the MICR character '8' from the left to the right. The waveform therefore illustrates the relative change in character density for the MICR character '8' at various positions from the left edge of the MICR character. Readers will note that the MICR signal illustrated by the waveform of FIG. 3B is the derivative of the character density signal illustrated by the waveform of FIG. 3A.

Figure 4:
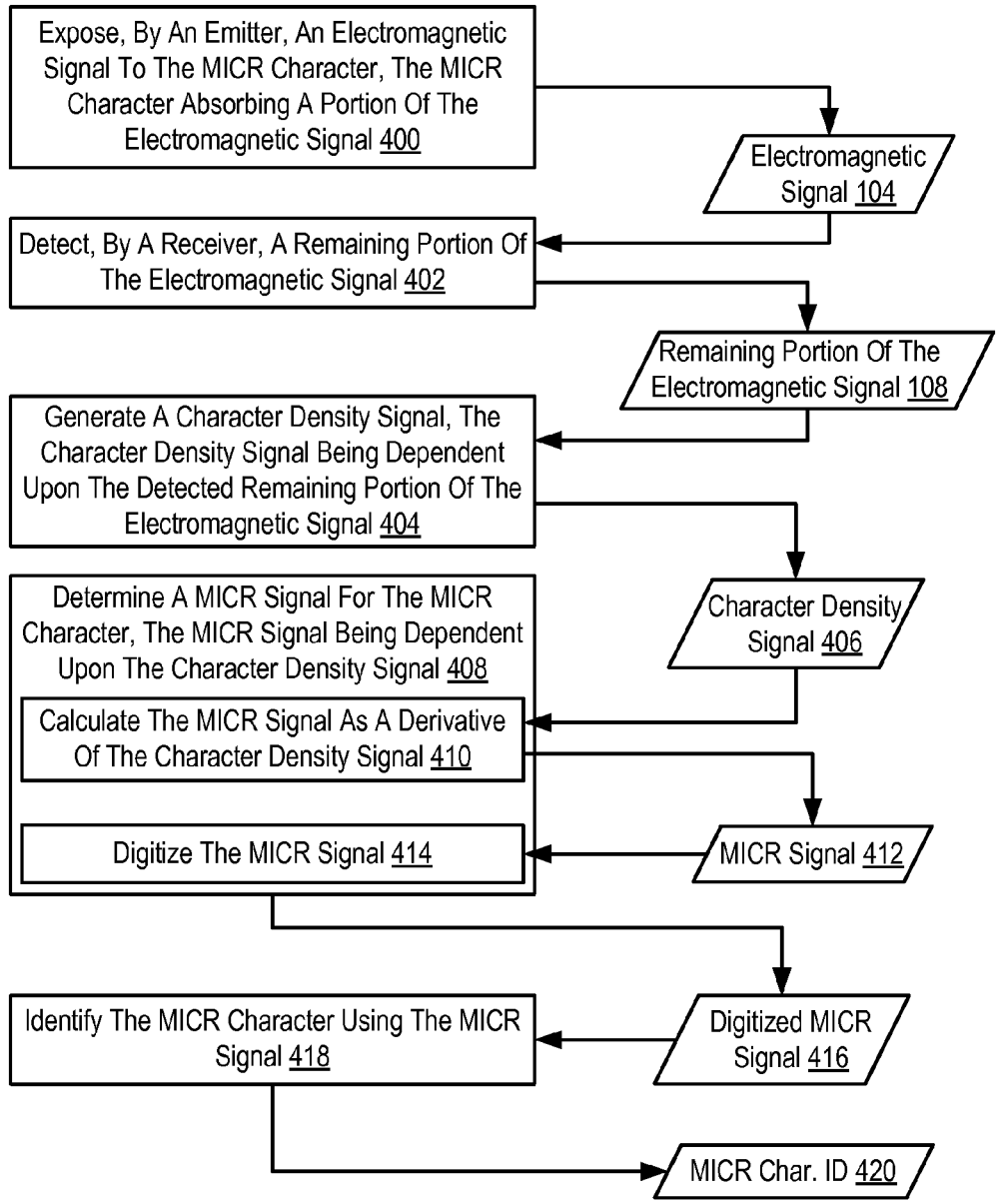
FIG. 4 sets forth a flow chart illustrating an exemplary method of MICR signal generation for a MICR character according to embodiments of the present invention.

For further explanation, FIG. 4 sets forth a flow chart illustrating an exemplary method of MICR signal generation for a MICR character according to embodiments of the present invention. The MICR character described with reference to FIG. 4 is configured on a medium. The medium is typically implemented as check paper, but any other medium as will occur to those of skill in the art may also be useful in MICR signal generation for a MICR character according to embodiments of the present invention.

The method of FIG. 4 includes exposing (400), by an emitter of a MICR reader, an electromagnetic signal (104) to the MICR character. The electromagnetic signal (104) of FIG. 4 is typically implemented at a frequency such that the portion of the electromagnetic signal (104) that falls on the magnetic ink used to form the MICR character is absorbed at a much higher rate by the magnetic ink than the portion of the electromagnetic signal (104) that falls directly on the medium. Depending on the configuration of the emitter and the receiver in a MICR reader, the frequency of the electromagnetic signal (104) may be selected such that the portion of the electromagnetic signal (104) that falls directly on the medium passes through the medium or is reflected off of the medium. For example, when the emitter and the receiver of the MICR reader are on opposite sides of the medium, then a frequency may be selected for the electromagnetic signal (104) such that the portion of the electromagnetic signal (104) that falls directly on the medium passes through the medium and is detected by the receiver. When the emitter and the receiver of the MICR reader are on a same side of the medium, however, then a frequency may be selected for the electromagnetic signal (104) such that the portion of the electromagnetic signal (104) that falls directly on the medium is reflected off of the medium and is detected by the receiver.

Exposing (400), by an emitter, an electromagnetic signal (104) to the MICR character according to the method of FIG. 4 is carried out by passing the electromagnetic signal (104) through a thin vertical slot between the emitter and the medium such that the electromagnetic signal (104) falls on a thin vertical slice of the MICR character. The MICR character absorbs a portion of the electromagnetic signal (104), while the remaining portion (108) of the electromagnetic signal (104) passes through the medium or reflects off of the medium, depending on the frequency of the electromagnetic signal (104) as described above. As mentioned above, the emitter may be implemented as a phototransistor.

The method of FIG. 4 also includes detecting (402), by a receiver, a remaining portion (108) of the electromagnetic signal (104). The remaining portion (108) of the electromagnetic signal (104) in the example of FIG. 4 represents the character density for the MICR character. Detecting (402), by a receiver, a remaining portion (108) of the electromagnetic signal (104) according to the method of FIG. 4 may be carried out by receiving the remaining portion (108) of the electromagnetic signal (104) through a thin vertical slot between the medium and the receiver such that the remaining portion (108) of the electromagnetic signal (104) falls on the receiver. As mentioned above, the receiver may be implemented as a phototransistor.

The method of FIG. 4 also includes generating (404) a character density signal (406), the character density signal being dependent upon the detected remaining portion (108) of the electromagnetic signal (104). Generating (404) a character density signal (406) being dependent upon the detected remaining portion (108) of the electromagnetic signal (104) according to the method of FIG. 4 may be carried out in an analogue manner by varying the voltage on a character density signal line in proportion to the remaining portion (108) of the electromagnetic signal (104) detected. In some other embodiments, generating (404) a character density signal (406) being dependent upon the detected remaining portion (108) of the electromagnetic signal (104) may be carried out in a digital manner by sampling and quantizing the remaining portion (108) of the electromagnetic signal (104) detected as the medium and the MICR character pass between the emitter and the receiver.

The method of FIG. 4 includes determining (408) a MICR signal (412) for the MICR character, the MICR signal being dependent upon the character density signal (406). Determining (408) a MICR signal (412) for the MICR character, the MICR signal being dependent upon the character density signal (406), according to the method of FIG. 4 includes calculating (410) the MICR signal (412) as a derivative of the character density signal (406) and digitizing (414) the MICR signal (412). Calculating (410) the MICR signal (412) as a derivative of the character density signal (406) may be carried out using a resistive-capacitive circuit. Digitizing (414) the MICR signal (412) according to the method of FIG. 4 may be carried out using an analogue-to-digital converter capable of sampling and quantizing the MICR signal (412).

In some other embodiments, determining (408) a MICR signal (412) for the MICR character, the MICR signal being dependent upon the character density signal (406), according to the method of FIG. 4 may be carried out by digitizing the character density signal (406) and calculating a digital MICR signal as a derivative of the digitized character density signal. In such an embodiment, digitizing the character density signal (406) may be carried out using an analogue-to-digital converter. Calculating a digital MICR signal as a derivative of the digitized character density signal may be carried out using digital derivation circuitry or a digital derivative software algorithm processed by a microcontroller or a general-purpose computer processor.

The method of FIG. 4 also includes identifying (418) the MICR character using the MICR signal (412). Identifying (418) the MICR character using the MICR signal (412) according to the method of FIG. 4 may be carried out by comparing the peaks and troughs for the digitized MICR signal (416) to a set of MICR character profiles and selecting an identifier for the MICR character having a profile matching the peaks and troughs for the current digitized MICR signal (416). Each MICR character profile specifies the peaks and troughs for a particular MICR character's MICR signal. Identifying (418) the MICR character using the MICR signal (412) according to the method of FIG. 4 may then be carried out by providing the MICR character identifier to some other component or software module for further processing as will occur to those of skill in the art.

Exemplary embodiments of the present invention are described largely in the context of a fully functional system for MICR signal generation for a MICR character. Readers of skill in the art will recognize, however, that portions of the present invention also may be embodied in a computer program product disposed on a computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of Magnetic Ink Character Recognition ('MICR') signal generation for a MICR character configured on a medium, the method comprising:
    exposing, by an emitter, an electromagnetic signal to the MICR character, the MICR character absorbing a portion of the electromagnetic signal;
    detecting, by a receiver, a remaining portion of the electromagnetic signal, the remaining portion of the electromagnetic signal representing the character density for the MICR character;
    generating a character density signal, the character density signal being dependent upon the detected remaining portion of the electromagnetic signal; and
    determining a MICR signal for the MICR character, the MICR signal being dependent upon the character density signal.

2. The method of claim 1 further comprising identifying the MICR character using the MICR signal.

3. The method of claim 1 wherein determining a MICR signal for the MICR character further comprises:
    calculating the MICR signal as a derivative of the character density signal; and
    digitizing the MICR signal.

4. The method of claim 1 wherein the emitter and the receiver are on a same side of the medium.

5. The method of claim 1 wherein the emitter and the receiver are on opposite sides of the medium.

6. The method of claim 1 wherein the electromagnetic signal is an infrared signal.

7. A system of Magnetic Ink Character Recognition ('MICR') signal generation for a MICR character configured on a medium, the system comprising:
    means for exposing an electromagnetic signal to the MICR character, the MICR character absorbing a portion of the electromagnetic signal;
    means for detecting a remaining portion of the electromagnetic signal, the remaining portion of the electromagnetic signal representing the character density for the MICR character;
    means for generating a character density signal, the character density signal being dependent upon the detected remaining portion of the electromagnetic signal; and
    means for determining a MICR signal for the MICR character, the MICR signal being dependent upon the character density signal.

8. The system of claim 7 further comprising means for identifying the MICR character using the MICR signal.

9. The system of claim 7 wherein means for means for determining a MICR signal for the MICR character further comprises:
    means for calculating the MICR signal as a derivative of the character density signal; and
    means for digitizing the MICR signal.

10. The system of claim 7 wherein:
    the means for exposing an electromagnetic signal to the MICR character further comprises means for providing the electromagnetic signal to a side of the medium on which the MICR character is configured; and
    the means for detecting a remaining portion of the electromagnetic signal further comprises means for detecting the remaining portion of the electromagnetic signal on the same side of the medium.

11. The system of claim 7 wherein:
    the means for exposing an electromagnetic signal to the MICR character further comprises means for exposing the electromagnetic signal to a side of the medium on which the MICR character is configured; and
    the means for detecting a remaining portion of the electromagnetic signal further comprises means for detecting the remaining portion of the electromagnetic signal on an opposite side of the medium from which the MICR character is configured.

12. The system of claim 7 wherein the electromagnetic signal is an infrared signal.

13. A Magnetic Ink Character Recognition ('MICR') reader for MICR signal generation for a MICR character configured on a medium, the MICR reader comprising:
    a housing;
    an emitter mounted to the housing capable of exposing an electromagnetic signal to the MICR character, the MICR character absorbing a portion of the electromagnetic signal;
    a receiver mounted to the housing, the receiver oriented to detect a remaining portion of the electromagnetic signal, the remaining portion of the electromagnetic signal representing the character density for the MICR character, the receiver capable of generating a character density signal, the character density signal being dependent upon the detected remaining portion of the electromagnetic signal; and a signal processing component operatively coupled to the receiver and capable of determining a MICR signal for the MICR character, the MICR signal being dependent upon the character density signal.

14. The MICR reader of claim 13 further comprising a microcontroller operatively coupled to the signal processing component and capable of identifying the MICR character using the MICR signal.

15. The MICR reader of claim 13 wherein the signal processing component determines a MICR signal for the MICR character by calculating the MICR signal as a derivative of the character density signal and digitizing the MICR signal.

16. The MICR reader of claim 13 wherein the emitter and the receiver are mounted on a same side of the medium.

17. The MICR reader of claim 13 wherein the emitter and the receiver are on opposite sides of the medium.

18. The MICR reader of claim 13 wherein the electromagnetic signal is an infrared signal.

* * * * *